United States Patent [19]
Morris

[11] Patent Number: 5,165,367
[45] Date of Patent: Nov. 24, 1992

[54] CYLINDER LINERS

[75] Inventor: Leonard E. Morris, Colne, United Kingdom

[73] Assignee: AE Auto Parts Limited, West Yorkshire, England

[21] Appl. No.: 795,549

[22] Filed: Nov. 21, 1991

[30] Foreign Application Priority Data

Nov. 21, 1990 [GB] United Kingdom ............... 9025330

[51] Int. Cl.⁵ ............................................... F02F 1/10
[52] U.S. Cl. ................................................ 123/41.84
[58] Field of Search .............. 123/41.83, 41.84, 193.2

[56] References Cited

U.S. PATENT DOCUMENTS

| | | | |
|---|---|---|---|
| 1,226,820 | 5/1917 | Shultz | 384/432 |
| 1,396,890 | 11/1921 | Short | 123/41.74 |
| 1,420,684 | 6/1922 | Bradshaw | 123/41.42 |
| 1,607,265 | 11/1926 | Leipert | 123/41.84 |
| 1,643,645 | 9/1927 | Strand | 123/41.84 |
| 1,665,192 | 4/1928 | Spence | 123/41.84 |
| 2,010,183 | 8/1935 | Furay | 123/41.83 |
| 2,037,354 | 4/1936 | Treiber | 123/41.31 |
| 2,078,499 | 4/1937 | Ljungström | 123/41.42 |
| 2,148,639 | 2/1939 | Pielstick | 92/149 |
| 2,338,183 | 1/1944 | Jagersberger | 123/265 |
| 2,405,847 | 8/1946 | Pullin | 123/41.81 |
| 2,511,823 | 6/1950 | Klotsch | 123/195 R |
| 2,635,591 | 4/1953 | Kiekhaefer | 123/41.29 |
| 2,748,757 | 6/1956 | Morris | 123/53 BA |
| 2,783,749 | 3/1957 | Effman | 123/41.83 |
| 2,851,020 | 9/1958 | Dolza | 123/41.69 |
| 2,855,910 | 10/1958 | De Waern | 123/41.17 |
| 2,951,472 | 9/1960 | Skubic | 123/41.72 |
| 3,086,505 | 4/1963 | Bovard | 123/41.8 |
| 3,315,573 | 4/1967 | De Castelet | 123/41.72 |
| 3,400,695 | 9/1968 | Zaruba | 123/41.82 |

(List continued on next page.)

FOREIGN PATENT DOCUMENTS

| | | |
|---|---|---|
| 214713 | 4/1961 | Fed. Rep. of Germany . |
| 1908411 | 9/1970 | Fed. Rep. of Germany . |
| 203098 | 1/1971 | Fed. Rep. of Germany . |
| 2030983 | 1/1971 | Fed. Rep. of Germany . |
| 2140378 | 2/1973 | Fed. Rep. of Germany . |
| 1043913 | 11/1953 | France . |
| 1116882 | 5/1956 | France . |
| 2441728 | 6/1980 | France . |
| 275926 | 10/1927 | United Kingdom . |

(List continued on next page.)

OTHER PUBLICATIONS

CIMAC 9th International Congress On Combustion Engines; Stockholm, Sweden, 1971–William W. Peters.
British Standard 3526: 1962–Specification For Dimensions of Wet Type Cylinder Liners For I.C. Engines-Part I.

Primary Examiner—Noah P. Kamen
Attorney, Agent, or Firm—Nixon & Vanderhye

[57] ABSTRACT

A combustion engine has a cylinder liner with a top boss which is an interference fit in the engine block, and a mid-stop flange. The outer portion of the liner between the top boss and the mid-stop flange forms a wall of a coolant passage. A cylindrical inner portion of the liner is at least 30% of the length of the liner, and has a groove in the outer surface thereof adjacent to its bottom end. In the groove is a resilient support means, and when the liner is fitted in the block, the support means is compressed by contact with the block, to form a radial support for the bottom end of the cylinder liner. The resilient support means can be a corrugated spring steel strip.

15 Claims, 2 Drawing Sheets

FIG.1

U.S. PATENT DOCUMENTS

| Number | Date | Inventor | Class |
|---|---|---|---|
| 3,403,661 | 10/1968 | Valentine et al. | 123/41.84 |
| 3,418,993 | 12/1968 | Scheiterlein et al. | 123/195 R |
| 3,568,573 | 3/1971 | Bailey | 92/171 |
| 3,628,427 | 12/1971 | Bailey | 92/144 |
| 3,653,369 | 4/1972 | Fangman et al. | 123/193.1 |
| 3,714,931 | 2/1973 | Neitz et al. | 123/41.79 |
| 3,745,980 | 7/1973 | Pekar, Jr. et al. | 123/41.74 |
| 3,853,099 | 12/1974 | Feather et al. | 123/41.82 |
| 3,882,842 | 5/1975 | Bailey et al. | 123/193.2 |
| 3,996,913 | 12/1976 | Hamparian | 123/198 R |
| 4,059,278 | 11/1977 | Saylor et al. | 277/139 |
| 4,082,068 | 4/1978 | Hale | 123/41.02 |
| 4,095,803 | 6/1978 | Meier et al. | 277/12 |
| 4,131,093 | 12/1978 | Mansfield | 123/41.85 |
| 4,147,140 | 4/1979 | Mansfield | 123/41.77 |
| 4,237,847 | 12/1980 | Baugh et al. | 123/195 R |
| 4,244,330 | 1/1981 | Baugh et al. | 123/41.84 |
| 4,284,037 | 8/1981 | Kasting | 123/41.72 |
| 4,294,203 | 10/1981 | Jones | 123/195 R |
| 4,305,348 | 12/1981 | Martin | 123/41.82 |
| 4,369,627 | 1/1983 | Kasting et al. | 60/605 |
| 4,399,783 | 8/1983 | Hauser, Jr. | 123/193.3 |
| 4,474,144 | 10/1984 | Tanaka et al. | 123/52 MV |
| 4,494,492 | 1/1985 | Kochanowski | 123/41.84 |
| 4,505,234 | 3/1985 | Meiners | 123/41.84 |
| 4,523,555 | 6/1985 | Mezger et al. | 123/193.3 |
| 4,562,799 | 1/1986 | Woods et al. | 123/193.2 |
| 4,601,265 | 7/1986 | Wells | 123/41.28 |
| 4,638,769 | 1/1987 | Ballheimer | 123/41.84 |
| 4,759,317 | 7/1988 | Ampferer | 123/41.74 |
| 4,791,891 | 12/1988 | Kubis et al. | 123/41.84 |
| 4,876,119 | 9/1989 | Cooper et al. | 123/193.6 |
| 4,926,801 | 5/1990 | Eisenberg et al. | 123/41.83 |

FOREIGN PATENT DOCUMENTS

| | | |
|---|---|---|
| 406000 | 2/1934 | United Kingdom . |
| 484490 | 5/1938 | United Kingdom . |
| 491545 | 9/1938 | United Kingdom . |
| 522730 | 6/1940 | United Kingdom . |
| 615045 | 12/1948 | United Kingdom . |
| 1027810 | 4/1966 | United Kingdom . |
| 1215111 | 12/1970 | United Kingdom . |
| 1244800 | 9/1971 | United Kingdom . |
| 1449473 | 9/1976 | United Kingdom . |
| 1479139 | 7/1977 | United Kingdom . |
| 2034419A | 6/1980 | United Kingdom . |
| 2058912A | 4/1981 | United Kingdom . |

CYLINDER LINERS

BACKGROUND OF THE INVENTION

This invention relates to cylinder liners, and in particular to cylinder liners which are designed as wet liners with a mid-stop flange incorporated into the liner.

For convenience, in this specification and the accompanying claims, in an engine block each constituent cylinder liner in accordance with the present invention is considered to have an axis of symmetry which extends vertically above a co-operating crankshaft. The end of the liner remote from the crankshaft is referred to as the top or upper end, and the other end is referred to as the lower or bottom end. Approximately from the level of the mid-stop flange to the upper end is considered to extend the outer portion of the liner, and the remaining, inner portion of the liner is considered to extend from said mid-stop flange level to the bottom end of the liner. However, it will be understood that references describing the relative positions of the ends, and of the two constituent portions, of any arrangement within an engine block of a liner in accordance with the present invention, are included in the corresponding references given above with respect to the arrangement of a liner extending vertically above the crankshaft.

Further, the term radial, or radially-extending, is used in respect of any distance, or feature, extending in any direction in a plane at right angles to the axis of the cylinder liner; and the term axial, or axially-extending, is used in respect of any distance, or feature, extending parallel to the liner axis.

A cylinder liner of the general type to which the present invention relates is described and claimed in UK Patent No. 2 035 452. This specification describes a cylinder liner which has, in combination, a series of features which include a top boss on the liner the top boss having an axially extending cylindrical surface forming an interference fit with the engine block when in position; a mid-stop flange with a surface which extends radially outwardly from the liner and engages a complimentary radially extending ledge in the engine block; an upper portion between the top boss and the mid-stop flange which forms a wall of a coolant passage, the axial length of which passage wall is not more than 30% of the axial length of the liner; and an inner portion which has an axial length of at least 30% of the axial length of the liner and which is wholly free of direct supporting and heat conducting contact with the engine block.

In practice this liner design suffers from the disadvantage that lack of radial support at its bottom end allows the inner portion of the liner to ovalise during use to an undesirable extent, and under extreme conditions this is liable to lead to cracking of the liner.

From a practical point of view, however, it is difficult to provide an adequate support at the bottom end of the liner since this end of the liner is to be inserted into the block first, and the liner has an interference fit on the top boss, as stated above.

SUMMARY OF THE INVENTION

An object of the present invention is to provide a liner which is able to have adequate radial support at its bottom end, and yet is readily fitted in the engine block.

Thus, according to the present invention there is provided in or for an internal combustion engine, the engine having a block containing a cylinder cavity extending between the engine head and a crankshaft to which a piston is connected for reciprocating travel within the cylinder cavity, a liner stop positioned intermediate the ends of the cylinder cavity, a liner coolant passage formed to provide coolant to the outer surface of the liner, and a substantially annular radial support section for the bottom end of the liner, a replaceable cylinder liner which comprises
(i) a top end boss having a cylindrical axially extending outer surface to form an interference fit within the cylinder cavity when in use,
(ii) a mid-stop flange having a radially extending surface which engages the liner stop in the cylinder cavity,
(iii) a portion between the top boss and mid-stop flange which forms a wall of the coolant passage,
(iv) a substantially cylindrical inner portion which forms at least 30% of the axial length of the liner,
(v) a groove in the outer surface of the liner adjacent to the bottom end of the liner, and
(vi) a resilient support means located in said groove, the support means being of a form which, when the liner is fitted in said block, is compressed by contact with said support section for the bottom end of the liner.

The substantially annular radial support section for the bottom end of the liner may be discontinuous if gaps are required through which oil can drain, for example, provided that sufficient of the support section is present to provide support against excessive ovalisation in practice. Preferably the support section is present at those locations on the block which are opposite to the thrust and non-thrust faces of the liner, which faces are centered in the plane within which a connecting rod will move when it is attached to a piston located in the liner, said plane also being perpendicular to the axis of rotation of the crankshaft of the engine.

Preferably the resilient support means is shaped to ensure that oil can drain past the support means.

The preferred material for the resilient support means is spring steel which is heat conductive and ensures that the support means does not form a thermal barrier between the cylinder liner and the bottom end support section of the block. Preferably the support means is fashioned from a strip of spring steel of a width which fits comfortably in the groove in the liner, and is of a corrugated shape. The corrugations may be substantially square section, the bases of the corrugations are seated in the base of the groove, the sides of the corrugations extend approximately radially relative to the cylinder liner, each radially outer part of the corrugations is provided with a tang, and the sides are of a length so that only the tangs extend beyond the liner surface, the tangs to be pressed against the bottom end support section of the block.

BRIEF DESCRIPTION OF THE DRAWINGS

The invention will now be described in more detail, by way of example only, with reference to the accompanying drawings of which.

DESCRIPTION OF THE PREFERRED EMBODIMENT

Figure 1:
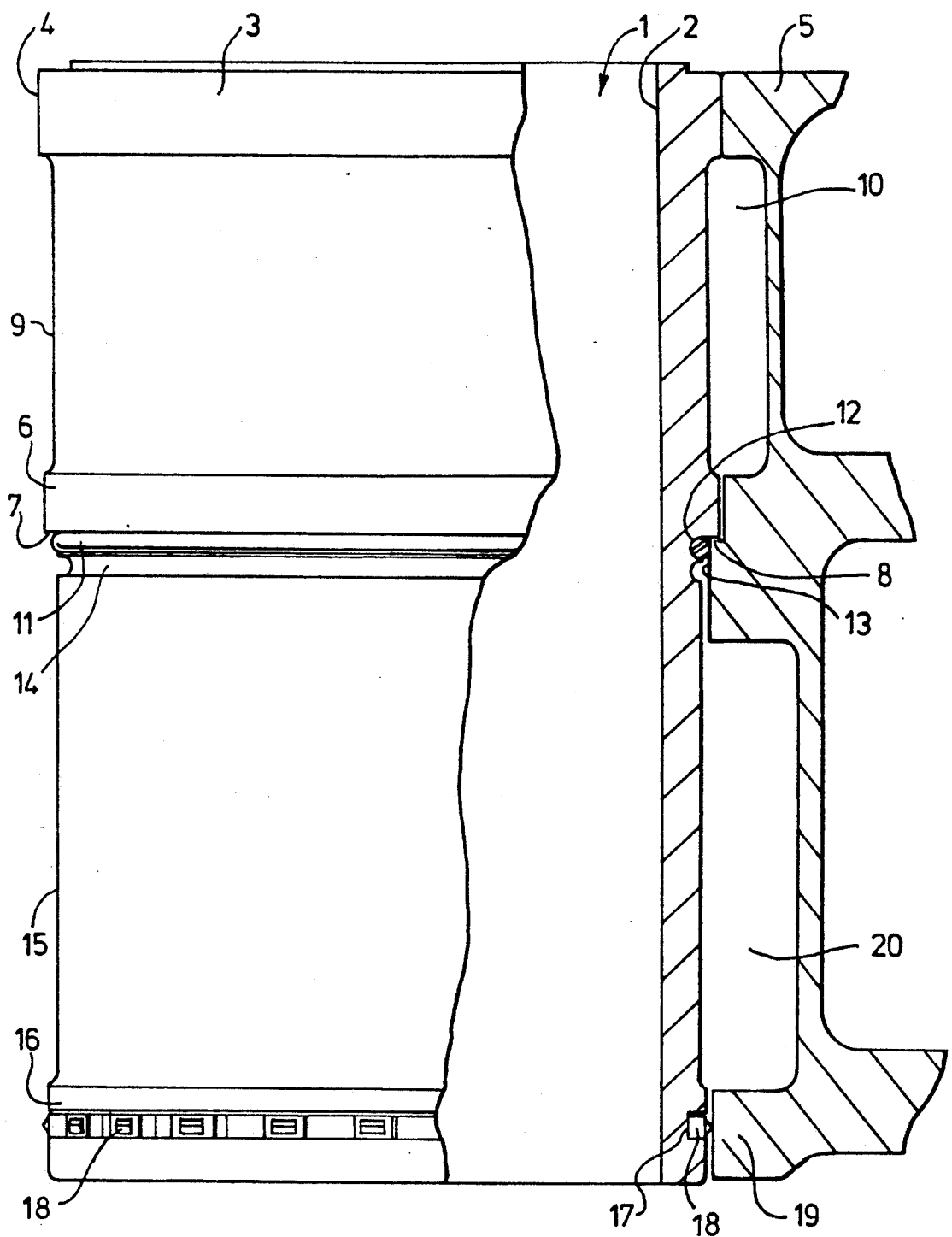
FIG. 1 is a side view of a cylinder liner in accordance with the invention at the time of fitting, partly in section, the sectional part of the figure also showing schematically in section adjacent portions of the engine block.

As shown in FIG. 1 a cylinder liner has a smooth cylindrical inner surface 2, against which a piston is to run, and also has an outer surface profile with several features. The top end of the cylinder liner 1, which is adjacent to a cylinder head (not shown) when in an engine, has a top boss 3 with an axially extending cylindrical outer surface 4 which makes an interference fit with an engaging section 5 of the engine block when the liner is in position in the cylinder cavity. Adjacent the mid-length of the liner is located a mid-stop flange 6, the lower surface 7 of which extends radially outwardly from the liner axis, and forms a sealing, and axially locating, engagement with an annular liner stop 8 in the engine block.

Between the top boss 3 and the mid-stop flange 6 lies a portion of the liner 9 which forms one wall of a channel 10 for coolant for the liner.

This coolant channel 10 is sealed at the top of the liner by the interference fit between the top boss 3 and engaging block section 5, with a back-up seal being provided in the engine by a cylinder head gasket (not shown). At the mid-stop flange the coolant channel is sealed first by the engagement of the lower flange surface 7 with the annular liner stop 8. A second seal is provided by means of a rubber sealing ring 11 located in a groove 12 in the liner below the mid-stop flange 6. The rubber sealing ring 11 seals against an annular sealing surface 13 provided in the engine block below the liner stop 8. A second groove 14 is provided on the liner surface below the groove 12 and may be used for further sealing material if required.

An inner portion 15 of the liner extending from below the seal or seals beneath the mid-stop flange has an accurately defined register 16 on the bottom end of the liner. Within this register 16 there is provided a groove 17 extending around the liner and containing a generally annular spring steel support means 18.

Figure 3:
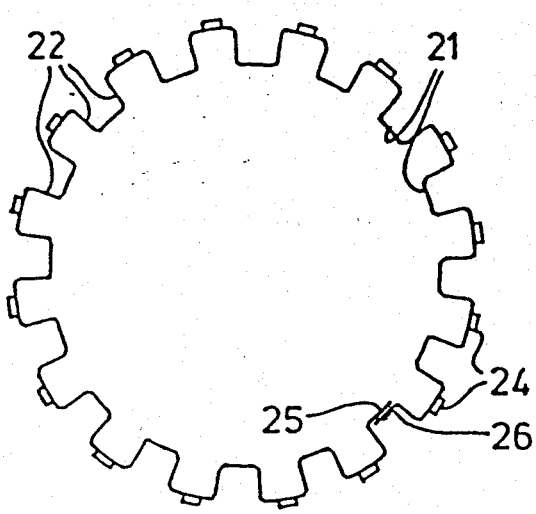
FIG. 3 is a plan view of the spring steel support means.
Figure 2:
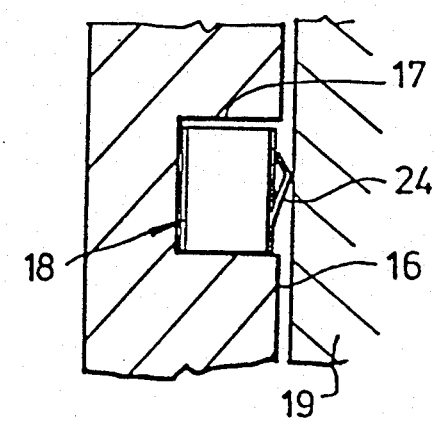
FIG. 2 is an enlarged view of a fragment of FIG. 1 showing a spring steel support means in contact with the engine block.
Figure 4:
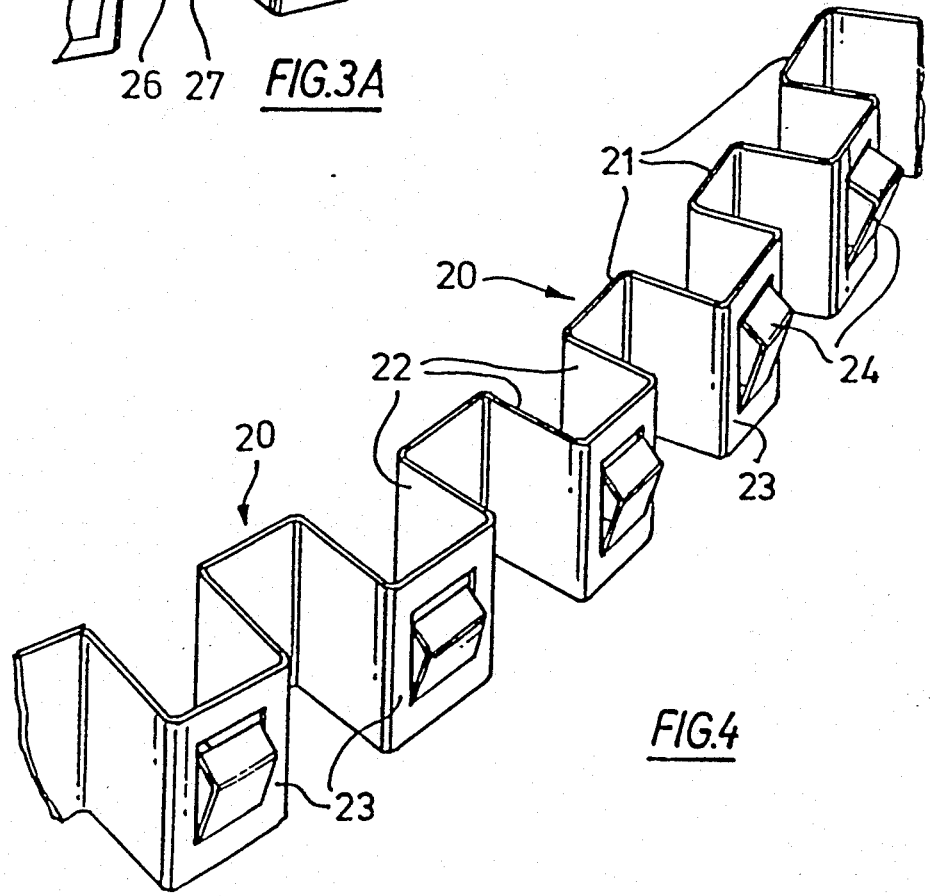
FIG. 4 is a fragmentary perspective view of the spring steel support means.

The spring steel support means 18 is shown in more detail in FIGS. 2 to 4, and as shown in FIGS. 1 and 2 a support section 19 for the bottom end of the liner is provided within the engine block adjacent the bottom register 16 on the liner.

Referring now to FIGS. 3 and 4 the support means 18 consists of a strip of spring steel formed into substantially square section corrugations 20. The bases 21 of the corrugations form the inner diameter of the means 18 and are of a width which will fit comfortably into the groove 17 (FIG. 2), and are seated in the base of the groove. The sides 22 of the corrugations extend approximately radially relative to the cylinder liner with the means 18 in position. The sides 22 are of a length chosen to be such that the radially outer parts 23 of the corrugations do not project beyond the outside surface of the register 16, except that each radially outer part 23 is provided with a tang 24 which does project beyond the register surface. The arrangement is such that, when the liner is in position in an engine, the tangs 24 are compressed by contact with the support section 19, and the means 18 radially supports the liner in the engine block at the bottom register 16.

Figure 3A:
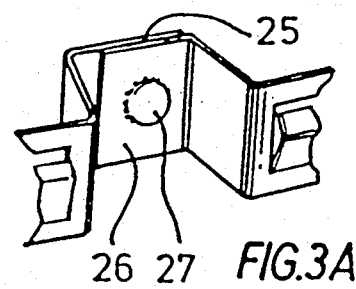
FIG. 3A is a perspective view of how the otherwise free ends of a longitudinally extending corrugated strip are welded together to provide the required support means.

As illustrated in FIG. 3A, in manufacturing the support means 18 the ends 25 and 26 of the spring steel strip can be welded together, for instance by a spot weld 27. The corrugated form of the means 18 illustrated allows the means 18 to be expanded to be fitted onto the cylinder liner.

Since the liner 1 is fitted into the engine block from the top, when fitting, the bottom register 16 has to pass through the annular liner stop 8; and into the support section 19, whilst providing the interference fit between the cylindrical outer surface 4 and the engaging sections 5 of the engine block. This is readily achieved with the liner of the present invention provided that proper attention is paid to the overall diameters of the various parts of the liner and the support means 18.

It will be understood that it is desirable that engine oil be able to pass the support means 18. Thus, for the liner shown in FIGS. 1 and 2 the bottom support section 19 in the block need not be a continuous annulus so that passages (not shown) are left for oil to pass freely out from cavity 20 into the crankcase region. However, the bottom support section 19 must be arranged to provide the required radial support for the bottom end of the liner adjacent those zones of the liner which are the thrust and non-thrust faces. These faces are centered in or adjacent to the plane in which the piston connecting rod is moving, and which plane is perpendicular to the axis of rotation of the crankshaft of the engine.

It will be appreciated that the tanged corrugated support means used in the present invention offers little obstruction to the flow of oil past the liner.

It will also be appreciated that the illustrated form of resilient support means is not the only arrangement which can be used and other arrangements may be used without departing from the spirit of the invention.

I claim:

1. In an internal combustion engine having a block containing a cylinder cavity extending between the engine head and a crankshaft to which a piston is connected for reciprocating travel within the cylinder cavity, a liner stop positioned intermediate the ends of the cylinder cavity, a liner coolant passage formed to provide coolant to the outer surface of the liner, and a substantially annular radial support section for the bottom end of the liner, a replaceable cylinder liner which comprises
   (i) a top end boss having a cylindrical axially extending outer surface adapted to form an interference fit within the cylinder cavity when in use,
   (ii) a mid-stop flange having a radially extending surface which is adapted to engage the liner stop in the cylinder cavity,
   (iii) a portion between the top boss and mid-stop flange which forms a wall of the coolant passage,
   (iv) a substantially cylindrical inner portion which forms at least 30% of the axial length of the liner,
   (v) a groove in the outer surface of the liner adjacent to the bottom end of the liner, and
   (vi) a resilient support means located in said groove, the support means being of a form which, when the liner is fitted in said block, is compressed by contact with said support section for the bottom end of the liner.

2. A replaceable cylinder liner as claimed in claim 1 in which the substantially annular radial support section for the bottom end of the liner is discontinuous about its circumference so as to contact the block at circumferentially spaced intervals.

3. A replaceable cylinder liner according to claim 1 in which the resilient support means is shaped to ensure that oil can drain past the support means.

4. A replaceable cylinder liner according to claim 1 in which the resilient support means is spring steel.

5. A replaceable cylinder liner according to claim 4 having said support means fashioned from a strip of spring steel of a width which fits comfortably in the groove in the liner, and is of a corrugated shape.

6. A replaceable cylinder liner according to claim 5 in which the corrugations are of substantially square section, having bases, sides and radially outer parts, the bases of the corrugations are seated in the base of the groove, the sides of the corrugations extend approximately radially relative to the cylinder liner, each radially outer part of the corrugations is provided with a tang, and the sides are of a length so that only the tangs extend beyond the liner surface, the tangs adapted to be pressed against said bottom end support section of the block.

7. In an internal combustion engine including a block having at least one cylinder cavity extending between an engine head and a crankshaft to which a piston is connected for reciprocating travel within the cylinder cavity, the cylinder cavity having upper and lower liner engaging sections and a liner stop positioned intermediate the upper and lower liner engaging sections, a replaceable cylinder liner comprising:

i) a top end boss having a cylindrical, axially extending outer surface adapted to form an interference fit in the upper liner engaging section in said cylinder cavity;

ii) a mid-stop flange having a radially outwardly extending surface adapted to seat on the liner stop;

iii) an annular groove formed in a radially outward surface of a register of the liner adjacent the bottom end thereof; and iv) a resilient metal support element seated in said annular groove, circumferentially spaced portions of said element adapted to be urged into contact with the lower liner engaging section;

wherein said replaceable liner is adapted to be inserted within the cavity from above the block, with the register adjacent the bottom end of the liner and the resilient metal support element passing through the liner stop.

8. The combination of claim 7 wherein a coolant passage is defined by a portion of the liner between said top end boss and said mid-stop flange, and a portion of the cylinder cavity extending between the upper liner engaging section and the liner stop portion.

9. The combination of claim 7 wherein another annular groove is formed in said liner, adjacent and below said mid-stop flange, said another groove having a sealing ring located therein.

10. The combination of claim 7 wherein said metal support element comprises a corrugated spring steel strip.

11. The combination of claim 10 wherein said corrugated spring steel strip includes a plurality of adjacent corrugations defined by radially inner base portions, side walls and radially outer portions, and wherein said circumferentially spaced portions adapted to be urged into contact with the lower liner portions comprise projecting tangs formed on said radially outer portions.

12. A replaceable cylinder liner comprising a substantially cylindrical member having top and bottom ends, a smooth inner surface and an outer surface, the outer surface formed with:

i) a radially outwardly extending top end boss;

ii) a radially outwardly extending mid-stop flange located between said top and bottom ends;

iii) a radially outwardly extending bottom end register, said register formed with a radially outwardly facing annular groove; and iv) a resilient annular metal ring seated in said annular groove, said metal ring having circumferentially spaced portions which extend radially beyond said bottom end register.

13. The liner of claim 12 wherein another annular groove is formed in said liner, adjacent and below said mid-stop flange, said another groove having a sealing ring located therein.

14. The liner of claim 13 wherein said metal support element comprises a corrugated spring steel strip.

15. The liner of claim 14 wherein said corrugated spring steel strip includes a plurality of adjacent corrugations defined by radially inner base portions, side walls and radially outer portions, and wherein said circumferentially spaced portions adapted to be urged into contact with the lower liner portions comprise projecting tangs formed on said radially outer portions.

* * * * *